G. A. HOLDEN.
Improvement in Tubing-Tongs.

No. 132,579. Patented Oct. 29, 1872.

Witnesses:
P. C. Dieterich
C. Sedgwick

Inventor:
G. A. Holden
per
Attorneys.

UNITED STATES PATENT OFFICE.

GEORGE A. HOLDEN, OF RUGGVILLE, PENNSYLVANIA, ASSIGNOR TO HIMSELF AND J. R. HOLDEN, OF SAME PLACE.

IMPROVEMENT IN TUBING-TONGS.

Specification forming part of Letters Patent No. 132,579, dated October 29, 1872.

*To all whom it may concern:*

Figure 1:
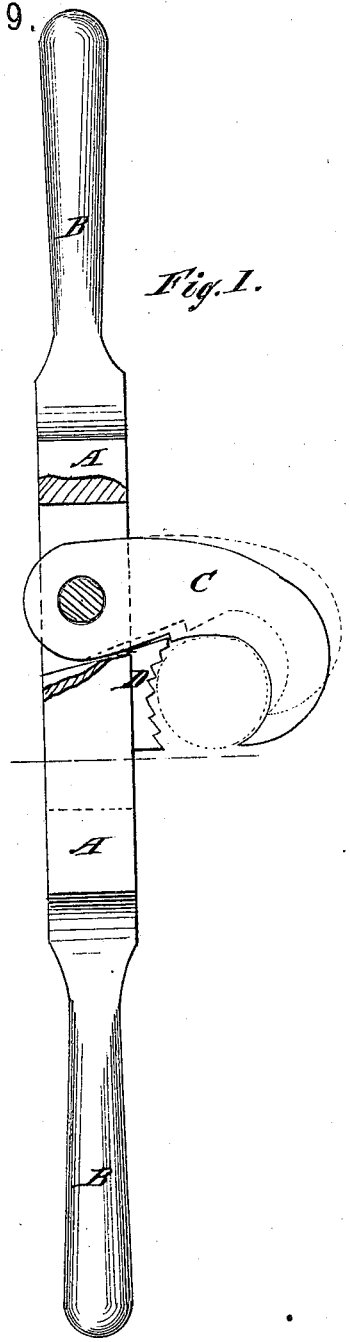
Figure 2:
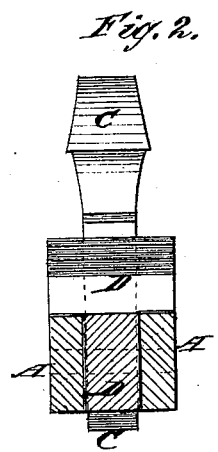

Be it known that I, GEORGE A. HOLDEN, of Ruggville, in the county of Venango and State of Pennsylvania, have invented a new and useful Improvement in Tubing-Tongs, of which the following is a specification:

Figure 1 is a side view of my improved tubing-tongs, part being broken away to show the construction. Fig. 2 is a detail cross-section of the same taken through the line $x\ x$, Fig. 1.

Similar letters of reference indicate corresponding parts.

My invention has for its object to furnish an improved tubing-tongs or pipe-wrench, designed especially for taking tubing out of and putting it into wells, and which shall be so constructed as to take a prompt and firm hold upon the pipe, and so as to enable two men to operate with the same tongs, thus avoiding the necessity of using two ordinary tongs, and the consequent risk of injury to the tubing; and it consists in the construction and combination of the various parts of the tongs, as hereinafter more fully described.

A is the body of the tongs, which has a handle, B, formed upon each of its ends. The body A is slotted, and in the slot thus formed is pivoted the shank of the hook C, by which the pipe is held while being operated upon by the toothed block D. The block D is made with a tenon which enters and is secured in the slot in the body A just in front of the hook C.

In using the tongs the hook C is held in position against the tubing by the hand, and the toothed block D and hook C are so arranged that the moment the teeth of the block D touch the tubing the two parts C D clamp the said tubing and hold it tightly, and in such a way that they cannot slip upon it. Well-tubing is usually screwed firmly together, so that two men and two pairs of ordinary tongs are required to screw them up and unscrew them. The two handles of my improved tongs enable two men to work with the same tongs with better effect and with less danger of injuring the tubing than when ordinary tongs are used.

With this construction, also, there are no springs or screws to get out of order or wear, the only part subject to wear being the teeth of the block D, which block may be readily removed, the teeth sharpened, and the block replaced in a few minutes.

Having thus described my invention, I claim as new and desire to secure by Letters Patent—

1. A tubing-tongs provided with two handles upon its opposite ends, substantially as herein shown and described, and for the purpose set forth.

2. The pivoted hook C and stationary toothed block D, constructed and combined with each other and with the slotted body A and handles B, substantially as herein shown and described, and for the purpose set forth.

G. A. HOLDEN.

Witnesses:
    E. D. DODGE,
    SOLON C. KEMON.